United States Patent
Kim et al.

(10) Patent No.: US 7,453,619 B2
(45) Date of Patent: Nov. 18, 2008

(54) ROTARY OPTICAL DELAY LINE

(75) Inventors: Geun Ju Kim, Busan (KR); Yun Sik Jin, Changwon-si (KR); Seok Gy Jeon, Changwon-si (KR); Jung Il Kim, Changwon-si (KR)

(73) Assignee: Korea Electrotechnology Research Institute, Gyeongsangnam-Do (KR)

( * ) Notice: Subject to any disclaimer, the term of this patent is extended or adjusted under 35 U.S.C. 154(b) by 0 days.

(21) Appl. No.: 11/981,653

(22) Filed: Oct. 31, 2007

(65) Prior Publication Data

US 2008/0144157 A1    Jun. 19, 2008

(30) Foreign Application Priority Data

Nov. 3, 2006    (KR) .................... 10-2006-0108131

(51) Int. Cl.
*G02B 26/08* (2006.01)

(52) U.S. Cl. .................... 359/226; 359/203; 359/212; 359/855

(58) Field of Classification Search ................ 359/203, 359/226

See application file for complete search history.

(56) References Cited

U.S. PATENT DOCUMENTS 5,907,423 A * 5/1999 Wang et al. ................ 359/203
7,046,412 B2 * 5/2006 Dorney ...................... 359/226

\* cited by examiner

*Primary Examiner*—James Phan
(74) *Attorney, Agent, or Firm*—The Webb Law Firm

(57) ABSTRACT

Disclosed herein is an optical delay line. The optical delay line includes a body and at least one wing, which constitute a rotating body that rotates around a rotational axis. The rotational wing includes a retroreflective curved surface, which is formed so that light can be vertically reflected by a reflective surface of the rotational wing. The retroreflective curved surface is formed so as to reversely reflect the light while varying an optical path difference at a predetermined speed when the rotating body rotates at a regular angular velocity. Thus, a long time delay value can be effectively generated.

10 Claims, 3 Drawing Sheets

ROTARY OPTICAL DELAY LINE

BACKGROUND OF THE INVENTION

1. Field of the Invention

The present invention relates generally to an optical delay line and, more particularly, to a rotary optical delay line that can acquire data at high speed and can generate a long optical path difference.

2. Description of the Related Art

A pump-probe experiment is a very useful technology that can measure variations in various physical and chemical phenomena over time using very short electromagnetic pulses on the femtosecond scale. Such a pump-probe experiment is generally carried out using two short optical pulses. One of the short optical pulses is used as a pump optical pulse and is radiated to a target, which is desired to be observed, thus causes a desired reaction. Information about this reaction is acquired by a probe optical pulse. This probe optical pulse is a signal that is intentionally delayed by a predetermined period of time with respect to the pump optical pulse.

Accordingly, when information is collected from a reaction, which is desired to be observed, while changing the time delay value between the pump optical pulse and the probe optical pulse, variations in the time that it takes for the reaction to occur can be known. In the case where this technology is used, phenomena that occur on the picosecond scale, which is a very short period, can be observed with femtosecond-scale temporal resolution.

An optical delay line, which is used to generate the time delay between the pump optical pulse and the probe optical pulse, may be implemented in various ways. A typical optical delay line, which is chiefly used for experiments which require a long time delay, is configured such that a retroreflector is mounted to a motorized linear translation stage, and optical pulses are reflected while a retroreflector is linearly translated parallel to the traveling direction of the optical pulses. The path difference between the optical pulses is generated according to the location of the retroreflector, and the time delay value between the pump optical pulse and the probe optical pulse is determined by this path difference.

Furthermore, most experiments acquire signals having reduced noise by chopping one of the two optical pulses and using a Lock-In Amplifier (LIA) that is tuned to the chopping frequency. In the above-described measurement, the translation velocity of the linear translation stage is the most important factor that is used to determine the signal acquisition speed. Generally, when the motorized linear translation stage is used, a time delay of more than 100 picoseconds can be realized. In this case, the time ranging from several minutes to ten minutes is taken to acquire data.

FIG. 1 is a conceptual diagram illustrating a retroreflector, which is mounted to a conventional linear translation stage, and a time delay, which is attributable to the linear reciprocation of the retroreflector. In FIG. 1, the retroreflector reciprocates in a predetermined range in the same direction as the direction in which incident and reflected optical beams travel. A method of controlling the motion of the retroreflector may be implemented in various ways, in addition to the motorized linear translation stage.

In the method of FIG. 1, the time that it takes for the retroreflector to be returned to its original location is one period, and the delay time of an optical beam, which corresponds to a half of a total translation distance, which is obtained by translating the retroreflector for this period, is obtained. The above-described time delay method is disadvantageous in that it cannot be used for pump-probe experiments in which a repetition rate of more than several tens of hertz and a time delay of more than several hundreds of picoseconds are required.

In the case where the linear translation stage is used, the method has numerous limitations for applications that must rapidly process data because the data acquisition time is too long. In order to solve this problem, various types of technologies have been developed. An optical time delay line, based on a principle similar to the mechanical principle of a crank shaft, which converts the linear motion of an engine piston into rotational motion, has been commercialized and is used. First, a bar, which periodically reciprocates in a predetermined range, has been manufactured using an electrical signal, which varies periodically, a galvanometer and a mechanical device for converting rotational motion into linear motion.

Furthermore, in the case where a retroreflector is mounted to this bar, a device that can realize a time delay at a repetition rate of more than several tens of hertz may be manufactured. However, this device is disadvantageous in that it is difficult to obtain an actual time delay because the velocity of the reciprocating retroreflector varies according to a trigonometric function, rather than varying linearly over time. Furthermore, in the case where the repetition rate is increased, the maximum time delay value decreases, and thus a sufficient time delay value may not be obtained. On the contrary, in the case where a large time delay value is obtained, the repetition rate decreases, and thus the data acquisition speed becomes slow.

SUMMARY OF THE INVENTION

Accordingly, the present invention has been made keeping in mind the above problems occurring in the prior art, and the present invention is intended to provide a rotary optical delay line, which greatly increases the repetition rate of a time delay, enables time delay values to vary linearly with respect to all the rotational angles of a rotating body, and in which the maximum time delay value is not limited, thus generating a long time delay value.

Furthermore, the present invention is intended to provide a rotary optical delay line, which can be easily designed, manufactured and mounted, and can realize stable motion, having high reproducibility, even during high-speed rotation.

The present invention provides a rotary optical delay line, including a body and at least one wing, which constitute a rotating body that rotates around a rotational axis, wherein the wing extends from the body at a location that is spaced apart from the central axis of the body by a predetermined distance, and includes a retroreflective curved surface, which is formed so that light can be vertically reflected by a reflective surface of the rotational wing, the retroreflective curved surface being formed so as to reversely reflect the light while varying an optical path difference at a predetermined speed when the rotating body rotates at a regular angular velocity.

It is preferred that the retroreflective curved surface be a curved line that is formed of (x, y) continuous points in an x-y plane using a parameter θ, and be expressed by the following Equation 1.

$$x = a(\theta \cos\theta - \sin\theta)$$

$$y = a(\cos\theta + \theta \sin\theta - 1) \quad (1)$$

(wherein a point at which the retroreflective curved surface is started from the rotational axis is defined as the origin of coordinates, x and y are coordinate values, and θ is a rotational angle)

It is preferred that the rotating body include two or more wings in order to acquire data at high speed. It is preferred that the wing be in the form of at least one of a first wing having a concave retroreflective curved surface and a second wing having a convex retroreflective curved surface. It is preferred that the central axis of the rotational axis be the center of gravity of the rotating body.

Furthermore, it is preferred that the rotating body be formed using appropriate material and in an appropriate form so that the weight thereof becomes light when the rotating body is rotated at high speed. A rotating body, to which processes such as coating and polishing can be easily applied, is preferable in order to increase the optical reflective characteristics of the curved surface.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention are described in detail with reference to the accompanying drawings below.

Figure 1:
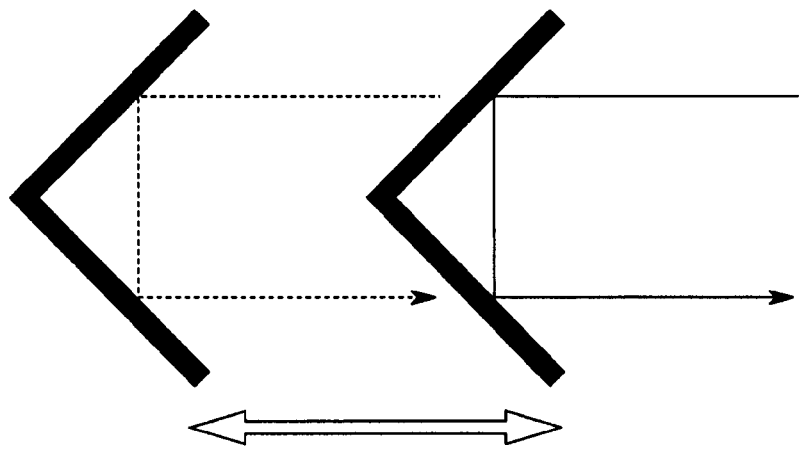
FIG. 1 is a conceptual diagram illustrating a retroreflector, which is mounted to a conventional linear translation stage, and a time delay, which is attributable to the linear reciprocation of the retroreflector.
Figure 2:
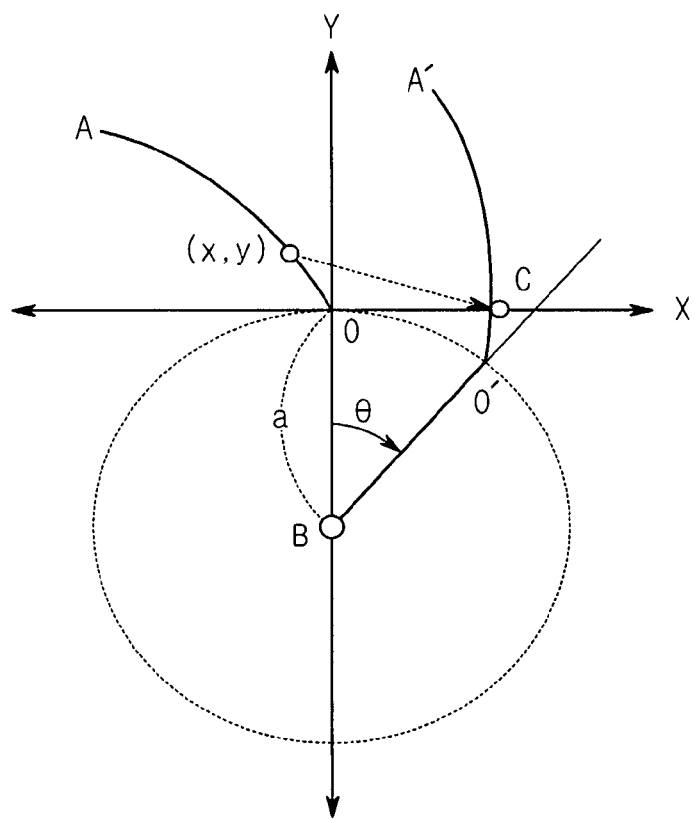
FIG. 2 is a diagram showing a curved line OA, which is created in an X-Y plane by an orthogonal projection of a retroreflective curved surface, according to the present invention.

FIG. 2 is a diagram showing curved surfaces of a rotary optical delay line in an X-Y plane according to the present invention. As shown in FIG. 2, the optical delay line according to the present invention is a rotating body that rotates around a rotational axis, and includes a body and at least one wing. The wing includes a corresponding reflector having a curved surface, which can reflect light when the rotating body rotates for a predetermined period of time.

As shown in FIG. 2, a curved surface OA acts as a retroreflective surface. The length in the direction of a z-axis, which corresponds to the thickness direction of the retroreflective surface, varies according to the system in which the invention is to be implemented. Generally, the length in the direction of the z-axis is several millimeters in an experimental device, but this is not indicated in FIG. 2. When a point 0 is defined as the origin of coordinates, all of the points on the curved surface can be expressed as (x, y) coordinate values based on the following Equation 1. Where 'a' denotes the distance from the start point on the curved surface to the rotational axis B, a parameter θ, which is used to express (x, y) coordinates in the following Equation 1, is the same as a rotational angle θ with respect to the origin that is generated when an arbitrary point taken on a curved line OA is transformed to a point C on a curved line O'A', as shown in FIG. 2, and is given in radians.

Equation 1 satisfies the following two conditions: first, the tangent line of the curved line at a point C, at which the curved line OA intersects the x-axis when it is rotated at an arbitrary angle θ with respect to a rotational axis that passes through a point B and is parallel to a z-axis, is perpendicular to the x-axis, and, second, the length of a straight line OC is equal to the length of an arc OO' (=aθ). Accordingly, in the case where an incident optical beam is oriented along the x-axis, the incident optical beam travels along the x-axis even when it is reflected by the curved line O'A'.

In this case, the optical path difference of the optical beam is determined by the distance between a point O and a point C. This distance is always given as aθ, so that, when the rotating body rotates at a regular angular velocity, the optical path difference varies linearly with respect to the rotational angle θ. Furthermore, a long optical path difference can be generated even with respect to the value of θ by increasing the dimension of the rotational radius a.

$$x = a(\theta \cos\theta - \sin\theta)$$
$$y = a(\cos\theta + \theta \sin\theta - 1) \quad (1)$$

Figure 3A:
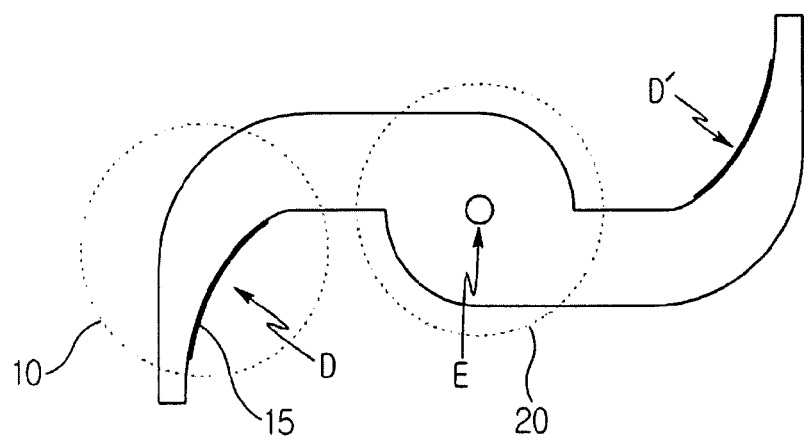
FIGS. 3A and 3B are diagrams showing a rotary optical delay line including a concave retroreflective curved surface, and an embodiment of an interferometer using the rotary optical delay line, according to the present invention.
Figure 3B:
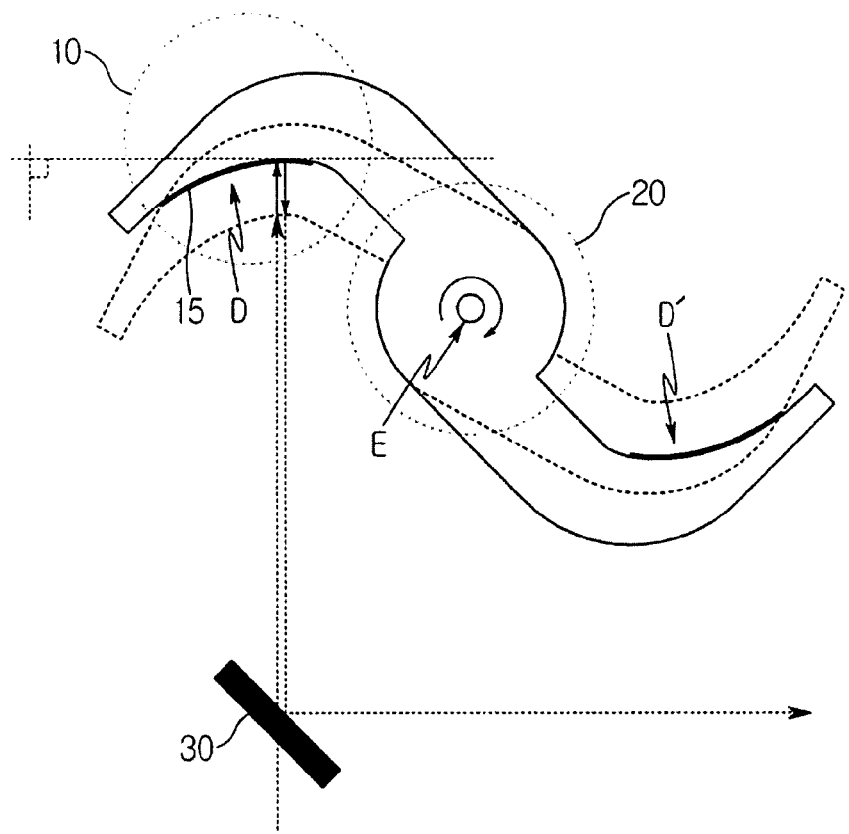

FIGS. 3A and 3B are diagrams showing a rotary optical delay line including a concave retroreflective curved surface, and an embodiment of an interferometer using the rotary optical delay line, according to the present invention. As shown in FIGS. 3A and 3B, the optical delay line according to the present invention is a rotating body that rotates around a rotational axis, and includes a body 20 and a wing 10. The wing 10 includes a reflector having a curved surface, which can reflect light when the rotating body rotates for a predetermined period of time. In FIG. 3A, a flat plate having a predetermined thickness is vertically cut along a curved line that satisfies Equation 1, and thus a retroreflective curved surface D is formed. In order to retroreflect an optical beam, various surface processing techniques may be applied to the surface. That is, various kinds of material 15, such as gold, silver, aluminum and platinum, which can increase the reflection of light, which is radiated from a light source, are applied to the surface, so that the manufacturing cost can be reduced and the optical delay line can be formed to have a light structure.

Furthermore, it is preferred that another wing be provided as a retroreflector, and that the rotational axis E pass through the center of gravity of the entire structure. A hole is formed at a location in the rotational axis E, so that connection to a motor for rotating the rotating body 20 can be made. Furthermore, it is preferred that another hole be formed around the rotational axis E for coupling with a motor shaft. A retroreflective curved surface D' is formed in the same manner as the retroreflective curved surface D. One or more retroreflectors may be additionally provided according to the detailed specification of a system. The additional retroreflectors may have the convex structure shown in FIGS. 4A and 4B. Accordingly, as needed, concave retroreflectors and convex retroreflectors may be appropriately combined for use thereof, and both concave and convex reflectors may be used for a single wing.

FIG. 3B is a diagram showing an example of an interferometer, which is constructed using an optical delay line including a concave retroreflective curved surface, according to the present invention. As shown in FIG. 3B, a beam that passes through a beam slitter 30 is retroreflected by the retroreflective curved surface of the optical delay line, and is then reflected by the beam splitter 30.

In the above-described optical delay line according to the present invention, it is preferred that the locations of respective retroreflectors be designed such that the rotational axis passes through the center of gravity of the structure. When another retroreflector is provided, the repetition rate f of the time delay in the rotary optical delay line according to the present invention is given by the following Equation 2. Where N denotes the number of retroreflectors having reflective curved surfaces, which are presented by the present invention, ω denotes the angular velocity of the rotating body. The present invention includes all of the cases in which the repetition rate is expressed by the following Equation 2 when a plurality of retroreflective curved surfaces is used. FIGS. 3A and 3B show an example of an application in which N=2.

$$f = N\frac{\omega}{2\pi} \quad (2)$$

In the case where the rotary optical delay line, which is proposed by the present invention, is coupled to the axis of a motor (for example, a step motor) (not shown), the rotational angle of which can be finely controlled, and is then rotated, a very short optical delay can be realized. In the case where the rotary optical delay line is coupled to the axis of a motor, which can be rotated at high speed, and is then rotated, a time delay having a high repetition rate can be achieved, as demonstrated by Equation 2, and thus data can be acquired at high speed.

Accordingly, both the high repetition rate and the long time delay are simultaneously realized, and thus an optical delay line, which has advantages in that it can be used for a system having a high resolution optical delay line and in that it can be widely used in various fields, can be provided.

Figure 4A:
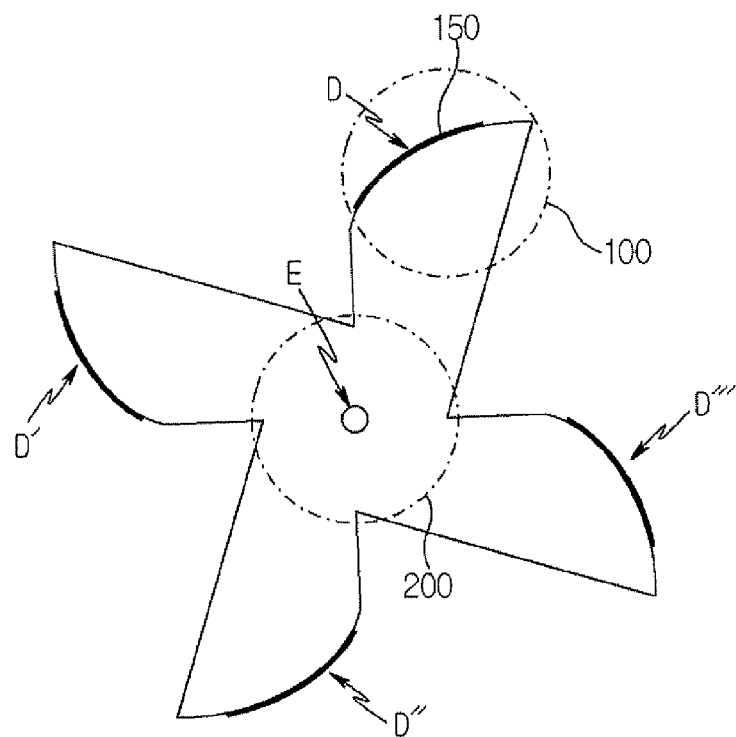
FIGS. 4A and 4B are diagrams showing a rotary optical delay line including a convex retroreflective curved surface, and an embodiment of an interferometer using the rotary optical delay line, according to the present invention.
Figure 4B:
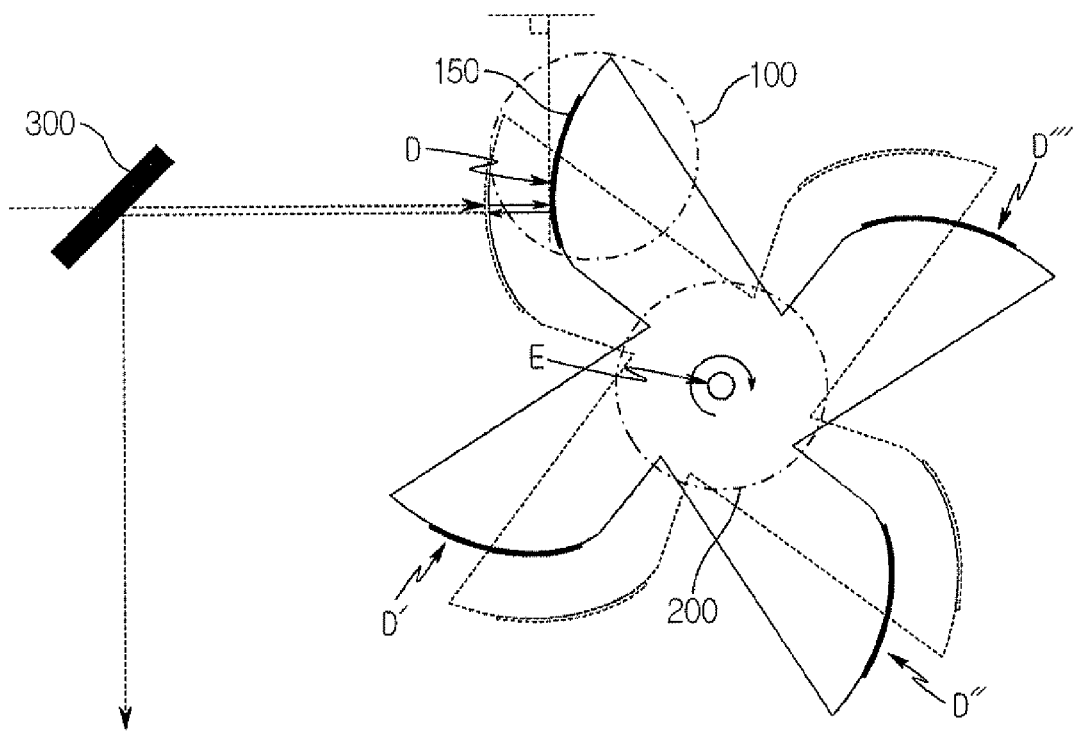

FIGS. 4A and 4B are diagrams showing a rotary optical delay line including a convex retroreflective curved surface, and an embodiment of an interferometer using the rotary optical delay line, according to the present invention. As shown in FIG. 4A, the rotary optical delay line is a rotating body, and includes a body 200 and wings 100 which act as retroreflectors. The wings 100 have respective convex retroreflective curved surfaces, which are based on the same principle as that applied to FIGS. 3A and 3B. Furthermore, the wings 100 are configured such that the optical path difference varies linearly with respect to the rotational angle when the rotating body rotates for a predetermined time. That is, the operational principle of the rotary optical delay line, shown in FIGS. 4A and 4B, is the same as that of the rotary optical delay line, shown in FIGS. 3A and 3B.

Accordingly, the rotary optical delay line may be provided with a plurality of retroreflective curved surfaces, and may implemented using a combination of concave wings and convex wings. The principle of the concave retroreflective curved surfaces is the same as that of the convex retroreflective curved surfaces, so that they can be combined according to need or application.

When the rotary optical delay line according to the present invention is provided as described above, the repetition rate of a time delay can be greatly increased, time delay values with respect to all of the rotational angles of the rotating body vary linearly, and the maximum time delay value is not limited. Accordingly, a long time delay value can be effectively generated.

Furthermore, the rotary optical delay line according to the present invention has a simple flat plate type structure, so that it can be easily manufactured, can be easily designed such that the rotational axis passes through the center of gravity of the flat plate type structure, and can realize stable motion having high reproducibility, even during high-speed rotation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotary optical delay line, comprising:
a body and at least one wing, which constitute a rotating body that rotates around a rotational axis,
wherein the wing extends from the body at a location that is spaced apart from a central axis of the body by a predetermined distance, and comprises a retroreflective curved surface, which is formed so that light can be vertically reflected by a reflective surface of the rotational wing, the retroreflective curved surface being formed so as to reversely reflect the light while varying an optical path difference at a predetermined speed when the rotating body rotates at a regular angular velocity.

2. The rotary optical delay line as set forth in claim 1, wherein the retroreflective curved surface is a concave retroreflective curved surface.

3. The rotary optical delay line as set forth in claim 2, wherein the rotating body comprises two or more wings.

4. The rotary optical delay line as set forth in claim 2, wherein the wing is formed using a first wing having a concave retroreflective curved surface and a second wing having a convex retroreflective curved surface.

5. The rotary optical delay line as set forth in claim 1, wherein the wing, which comprises the retroreflective curved surface, is formed using a combination of a concave retroreflective curved surface and a convex retroreflective curved surface.

6. The rotary optical delay line as set forth in claim 5, wherein the rotating body comprises two or more wings.

7. The rotary optical delay line as set forth in claim 1, wherein the wing is formed using a first wing having a concave retroreflective curved surface and a second wing having a convex retroreflective curved surface.

8. The rotary optical delay line as set forth in claim 1, wherein the central axis is a center of gravity of the rotating body.

9. The rotary optical delay line as set forth in claim 1, wherein the retroreflective curved surface is coated with material having high reflectivity with respect to the light.

10. The rotary optical delay line as set forth in claim 1, wherein a hole arranged in a predetermined pattern is formed in the body so that the rotating body can be coupled with a motor.

* * * * *